(12) United States Patent
Fregene et al.

(10) Patent No.: US 7,979,174 B2
(45) Date of Patent: Jul. 12, 2011

(54) AUTOMATIC PLANNING AND REGULATION OF THE SPEED OF AUTONOMOUS VEHICLES

(75) Inventors: Kingsley O. C. Fregene, Sicklerville, NJ (US); Michael R. Elgersma, Plymouth, MN (US); Samar Dajani-Brown, Blaine, MN (US); Stephen G. Pratt, St. Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 583 days.

(21) Appl. No.: 12/133,328

(22) Filed: Jun. 4, 2008

(65) Prior Publication Data

US 2009/0319112 A1    Dec. 24, 2009

Related U.S. Application Data

(60) Provisional application No. 60/975,978, filed on Sep. 28, 2007, provisional application No. 60/975,975, filed on Sep. 28, 2007.

(51) Int. Cl.
*G05D 13/00* (2006.01)
*G05D 1/00* (2006.01)

(52) U.S. Cl. .......................................... 701/23; 701/25
(58) Field of Classification Search .................. None
See application file for complete search history.

(56) References Cited

U.S. PATENT DOCUMENTS

| | | | |
|---|---|---|---|
| 4,862,373 A | 8/1989 | Meng | |
| 4,905,151 A | 2/1990 | Weiman et al. | |
| 4,939,651 A * | 7/1990 | Onishi | ............................. 701/26 |
| 4,982,329 A | 1/1991 | Tabata et al. | |
| 5,083,256 A | 1/1992 | Trovato et al. | |
| 5,111,401 A | 5/1992 | Everett, Jr. et al. | |
| 5,229,941 A * | 7/1993 | Hattori | ............................. 701/26 |
| 5,321,614 A | 6/1994 | Ashworth | |
| 5,379,223 A | 1/1995 | Asplund | |
| 5,646,855 A | 7/1997 | Jones et al. | |
| 5,793,934 A | 8/1998 | Bauer | |
| 5,870,303 A | 2/1999 | Trovato et al. | |
| 5,904,730 A | 5/1999 | Yamazaki et al. | |
| 6,038,502 A | 3/2000 | Sudo | |

(Continued)

FOREIGN PATENT DOCUMENTS

| | | | |
|---|---|---|---|
| JP | 63-40913 | * | 2/1988 |
| JP | 8-54925 | * | 2/1996 |
| WO | 0146766 | | 6/2001 |

OTHER PUBLICATIONS

Jackson et al., "Airborne Technology for Distributed Air Traffic Management", "European Journal of Control", Dec. 2005, pp. 1-14, vol. 11, Publisher: EUCA.

(Continued)

*Primary Examiner* — Michael J. Zanelli
(74) *Attorney, Agent, or Firm* — Fogg & Powers LLC (57) ABSTRACT

An autonomous vehicle comprises one or more sensors configured to obtain data regarding conditions which affect movement of the autonomous vehicle; a speed planner coupled to the one or more sensors and configured to calculate a desired speed based, at least in part, on the data obtained from the one or more sensors; and one or more actuators responsive to signals from the speed planner and configured to adjust the speed of the autonomous vehicle based on the desired speed calculated by the speed planner.

17 Claims, 5 Drawing Sheets

U.S. PATENT DOCUMENTS

| | | | |
|---|---|---|---|
| 6,084,989 | A | 7/2000 | Eppler |
| 6,141,293 | A | 10/2000 | Amorai-Moriya et al. |
| 6,249,738 | B1 | 6/2001 | Higashimata et al. |
| 6,377,875 | B1 | 4/2002 | Schwaerzler |
| 6,567,749 | B2 | 5/2003 | Matsuura |
| 6,577,269 | B2 | 6/2003 | Woodington et al. |
| 6,597,981 | B2 | 7/2003 | Nishira et al. |
| 6,834,380 | B2 | 12/2004 | Khazei |
| 6,907,336 | B2 | 6/2005 | Gray et al. |
| 6,926,233 | B1 | 8/2005 | Corcoran, III |
| 7,093,211 | B1 | 8/2006 | Downey et al. |
| 7,110,881 | B2 | 9/2006 | Gray et al. |
| 7,206,677 | B2 | 4/2007 | Hulden |
| 7,211,980 | B1 | 5/2007 | Bruemmer et al. |
| 7,272,474 | B1 * | 9/2007 | Stentz et al. ............ 701/26 |
| 7,272,492 | B2 | 9/2007 | McCubbin et al. |
| 7,734,387 | B1 * | 6/2010 | Young et al. ............ 701/23 |
| 2001/0027360 | A1 | 10/2001 | Nakano et al. |
| 2005/0021192 | A1 | 1/2005 | Takafuji et al. |
| 2005/0216182 | A1 | 9/2005 | Hussain et al. |
| 2006/0074557 | A1 | 4/2006 | Mulligan et al. |
| 2006/0293792 | A1 | 12/2006 | Hasegawa et al. |
| 2006/0293856 | A1 | 12/2006 | Foessel et al. |
| 2007/0046677 | A1 | 3/2007 | Hong et al. |
| 2007/0193798 | A1 | 8/2007 | Allard et al. |
| 2007/0241886 | A1 | 10/2007 | Breeding |
| 2008/0009965 | A1 | 1/2008 | Bruemmer et al. |
| 2008/0027591 | A1 | 1/2008 | Lenser et al. |
| 2008/0059015 | A1 | 3/2008 | Whittaker et al. |
| 2008/0125972 | A1 | 5/2008 | Neff |

OTHER PUBLICATIONS

Connolly, C.I. et al., "Path Planning Using Laplace'S Equation", "Computer and Information Science Department", Feb. 7, 1994, Publisher: University of Massachusetts At Amherst, Published in: Massachusetts USA.

Connolly, Christopher et al., "On the Applications of Harmonic Functions to Robotics", "Journal of Robotics Systems", Oct. 9, 1993, pp. 931-946, vol. 10, No. 7, Publisher: University of Massachusetts at Amhurst, Published in: Massachusetts USA.

Philipp et al., "Single-Chip Stereo Imager", "2006 IEEE International Solid-State Circuits Conference", 2006, Publisher: IEEE, Published in: Baltimore MD.

Li, Z.X. and T.D. Bui, "Robot Path Planning Using Fluid Model", "Journal of Intelligent and Robotic Systems", 1998, pp. 29-50, vol. 21, Publisher: Kluwer Academic Publishers, Published in: Montreal Canada.

Philipp, Ralf, "A Single-Chip Stereo Imager", "Computational Sensory Motor Systems Lab", Jun. 2, 2005, Publisher: John Hopkins University, Published in: New York, US.

Ramirez-Angulo et al., "Real Time Solution of Laplace Equation Using Analog VLSI Circuits", "IEEE International Symposium Circuits and Systems", 1994, pp. 95-98, vol. 4, Publisher: IEEE, Published in: Las Cruces, NM USA.

Stan et al., "Analog VLSI for Robot Path Planning", "Journal of VLSI Signal Processing", 1994, pp. 61-73, vol. 8, Publisher: Kluwer Academic Publishers, Published in: Boston MA.

Thrun, Sebastian, "Learning Occupancy Grids With Forward Models", "School of Computer Science http://www.cs.cmu.edu/~thrun", 2001, Publisher: Carnegie Mellon University, Published in: Pittsburgh, USA.

Valavanis, Kimon et al., "Mobile Robot Navigation in 2-D Dynamic Environments Using an Electrostatic Potential Field", "IEEE Transaction on Systems, Man and Cybernetics-Part A: Systema and Humans", 2000, pp. 187-196, vol. 30, No. 2, Publisher: IEEE.

* cited by examiner

AUTOMATIC PLANNING AND REGULATION OF THE SPEED OF AUTONOMOUS VEHICLES

CROSS-REFERENCE TO RELATED CASES

This application is related to the following applications, all of which are hereby incorporated herein by reference:

U.S. patent application Ser. No. 12/133,321, filed on even date herewith and entitled "Method and System for Automatic Path Planning and Obstacle/Collision Avoidance of Autonomous Vehicles."

U.S. provisional patent application Ser. No. 60/975,978, filed Sep. 28, 2007 and entitled "METHOD FOR AUTOMATICALLY PLANNING AND REGULATING THE SPEED OF AUTONOMOUS GROUND VEHICLES DURING OBSTACLE/COLLISION AVOIDANCE MANUEVERS." The present application hereby claims priority, under 35 U.S.C. §119(e), to U.S. Provisional Patent Application No. 60/975,978.

U.S. provisional patent application Ser. No. 60/975,975, filed Sep. 28, 2007 and entitled "METHOD FOR AUTOMATICALLY PLANNING AND REGULATING THE SPEED OF AUTONOMOUS AERIAL VEHICLES DURING OBSTACLE/COLLISION AVOIDANCE MANUEVERS." The present application hereby claims priority, under 35 U.S.C. §119(e), to U.S. Provisional Patent Application No. 60/975,975.

GOVERNMENT LICENSE RIGHTS

The U.S. Government may have certain rights in the present invention as provided for by the terms of Government Program name OAVII awarded by DARPA.

BACKGROUND

The development of autonomous vehicles has been a pursuit of many nations in the recent years. Various programs have been formed to encourage development of the technology necessary for autonomous vehicles. For example, in the United States, the Defense Advanced Research Projects Agency (DARPA) has sponsored an annual program called the DARPA Grand Challenge since 2004. The winner of the DARPA Grand Challenge each year receives a substantial monetary prize in order to encourage participation in the program.

DARPA has stated that it sponsors the Grand Challenge in order to fulfill a Congressional mandate which has set a goal for the "Armed Forces to achieve the fielding of unmanned, remotely controlled technology such that . . . by 2015, one-third of the operational ground combat vehicles are unmanned." In order to achieve this goal, the Armed Forces need vehicles which are capable of navigating and maneuvering without human control. In particular, an autonomous vehicle needs to determine the characteristics of its environment required to enable it to carry out the task it has been assigned. For example, the autonomous vehicle needs to plan and follow a path to its destination while detecting and avoiding obstacles. In addition, the autonomous vehicle needs to perform its tasks as quickly as possible without committing errors.

SUMMARY

The above-mentioned problems and other problems are resolved by the present invention and will be understood by reading and studying the following specification.

In one embodiment an autonomous vehicle is provided. The autonomous vehicle comprises one or more sensors configured to obtain data regarding conditions which affect movement of the autonomous vehicle; a speed planner coupled to the one or more sensors and configured to calculate a desired speed based, at least in part, on the data obtained from the one or more sensors; and one or more actuators responsive to signals from the speed planner and configured to adjust the speed of the autonomous vehicle based on the desired speed calculated by the speed planner.

DETAILED DESCRIPTION

In the following description, specific illustrative embodiments in which the invention may be practiced are shown and described. These embodiments are described in sufficient detail to enable those skilled in the art to practice the invention, and it is to be understood that other embodiments may be utilized and that logical, mechanical, and electrical changes may be made without departing from the scope of the present invention. Furthermore, the method presented in the drawing figures or the specification is not to be construed as limiting the order in which the individual steps may be performed. The following description is, therefore, not to be taken in a limiting sense.

When autonomous vehicles traverse obstacle-rich environments like urban areas, it becomes important to not only plan paths that avoid obstacles, but also plan how fast such a path should be traversed. Conventional path planning algorithms, however, do not inherently indicate the speed at which the vehicle should traverse the path. By automatically providing appropriate speed targets that are safe, feasible and achievable by the autonomous vehicle during path traversal, embodiments of the present invention enable an autonomous vehicle to complete tasks safely and quickly.

Figure 1:
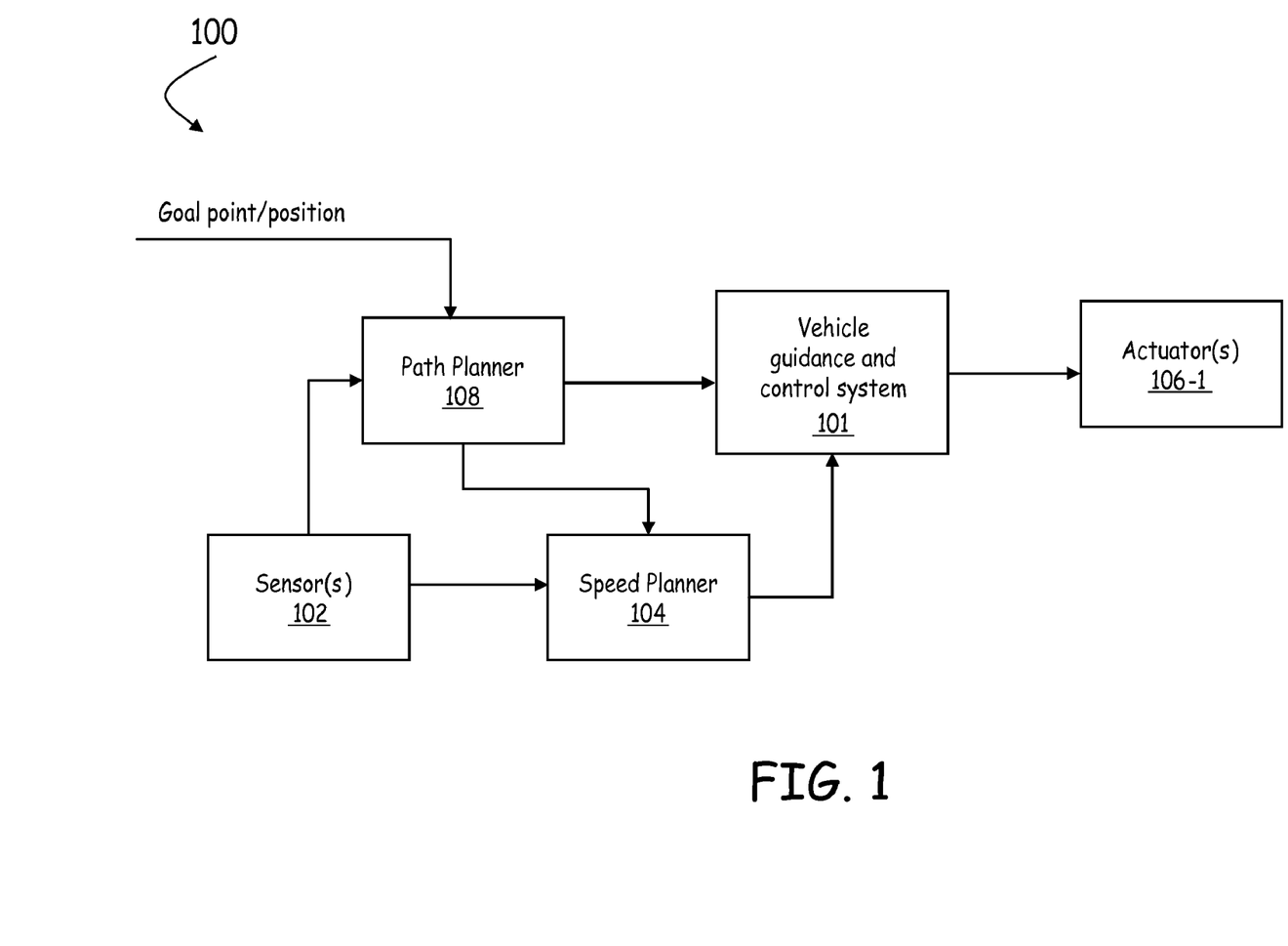
FIG. 1 is a block diagram depicting a system for providing automatic planning and regulation of the speed of autonomous vehicles

FIG. 1 is a system 100 for providing automatic planning and regulation of the speed of autonomous vehicles. System 100 includes one or more sensors 102, speed planner 104, path planner 108, vehicle guidance and control system, and one or more actuators 106. Speed planner 104 and path planner 108 receive input data from sensor(s) 102 regarding conditions which affect the movement of an autonomous vehicle. The input data received depends on the type of autonomous vehicle being implemented and the environment around the autonomous vehicle. For example, in some embodiments, the autonomous vehicle is implemented as an unmanned aerial vehicle. In such embodiments, the input data from sensor(s) 102 includes, but is not limited to, data regarding head winds, tail winds, altitude of the unmanned aerial vehicle, etc. In other embodiments, the autonomous vehicle is implemented as a ground vehicle. In such embodiments, the input data from sensor(s) 102 includes, but is not limited to, data regarding speed limit zones, road conditions, tire pressure, etc. Additionally, some input data from sensor(s) 102 is independent of the implementation of the autonomous vehicle. For example, independent input data includes, but is not limited to, data regarding obstacles in an area near the autonomous vehicle, weather conditions, etc. Data regarding obstacles includes, but is not limited to, the obstacle's location, speed, direction of travel, etc.

Figure 2:
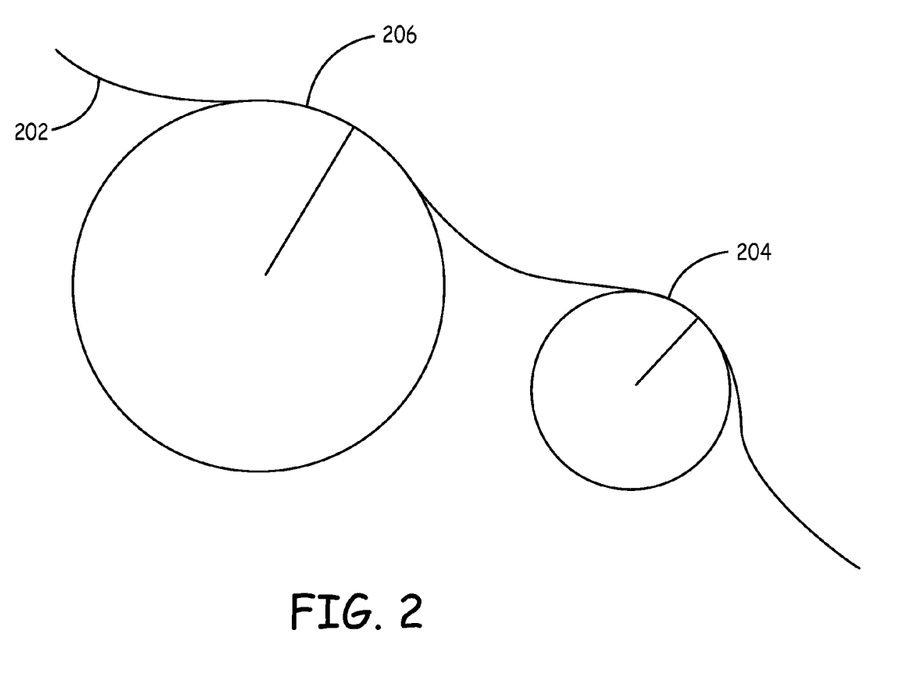
FIG. 2 depicts path curvature of an exemplary path for an autonomous vehicle.

Additionally, the input data includes measurements of the curvature of a planned path being traversed by the autonomous vehicle. As the autonomous vehicle traverses a curve of the path, such as a curve in a road, a lateral force is applied to the autonomous vehicle. The strength of the force is determined by the radius of the curve and the speed of the autonomous vehicle. For example, as shown in FIG. 2, path 202 contains two curves 204 and 206. Curve 204 has a smaller radius of curvature than curve 206 which corresponds to a greater lateral force applied to the autonomous vehicle for a given speed. Speed planner 104 uses curvature measurements to calculate an appropriate speed which will not cause the autonomous vehicle to overshoot its intended goal position or to roll over, in the case of a ground vehicle.

Speed planner 104 receives a calculated planned path from path planner 108. Path planner 108 calculates the planned path based on inputs from sensor(s) 102 and an input goal point/position. Any appropriate algorithm can be used to calculate the planned path. For example, in one embodiment the planned path is calculated using techniques described in co-pending patent application Ser. No. 12/133,321 which is incorporated herein by reference. Speed planner 104 calculates a desired speed for the planned path using the input data received from sensors 102. The desired speed is a speed which does not cause the autonomous vehicle to violate one or more constraints. The constraints applied are dependent on the vehicle and the planned path. For example, an autonomous vehicle traversing a path in an urban environment may have constraints corresponding to posted speed limits and traffic lights. Other constraints may include, but are not limited to, avoiding obstacles and maintaining the autonomous vehicle in valid operating conditions. For example, an aerial vehicle that cannot hover, must maintain a minimum speed in order to maintain flight. Thus, the desired speed cannot violate the minimum speed constraint if the aerial vehicle is to maintain valid operating conditions.

In some embodiments, the constraints are ordered by priority. For example, a minimum speed for an aerial vehicle has the highest priority in some embodiments. Similarly, avoidance of collision with obstacles has a higher priority, in some embodiments, than a constraint on speed limits. Hence, in such embodiments, speed planner 104 is configured to allow violation of lower priority constraints in order to avoid violation of a higher priority constraint. For example, in calculating the desired speed, speed planner 104 may determine that the autonomous vehicle cannot stay within a posted speed limit and still avoid collision with another vehicle. In such situations, speed planner 104 selects the desired speed which prevents the autonomous vehicle from colliding with the obstacle even thought the speed limit constraint is violated. Hence, speed constraints include, but are not limited to, constraints corresponding to the speeds necessary to respect constraints due to path properties, the vehicle's dynamic capabilities and the environment in which the vehicle operates; the speed that the vehicle can operate at but still stop (or turn away) safely before colliding with the nearest obstacle; the speeds the vehicle can operate at so that the vehicle platform remains stable enough for it to perform its mission (e.g. surveillance); the speeds that enable a smooth transition from obstacle avoidance mode to default guidance/control mode and vice versa; and the speed needed to enforce any other requirement imposed by relevant regulations.

In some embodiments, speed planner 104 calculates a desired speed which fits constraints for the entire planned path. In other embodiments, speed planner 104 calculates a desired speed for each of a plurality of points along the planned path. In addition, speed planner 104 updates the calculated desired speed as the vehicle traverses the planned path to account for changing circumstances, such as weather changes, appearance of new obstacles, etc. The desired speed of a vehicle, in the following example, is a function of maximum acceleration, closest distance to obstacles, path curvature, and time delay. It is to be understood that although the following example derives an equation based on acceleration, distance to obstacles and path curvature, other constraints and variables can be included in other embodiments as described above. Hence, the following derivation is provided by way of example and not by way of limitation. The example case formula can be expressed as:

$V_{cmd} = f(a_{max}, d_{stop}, t_{delay})$, where $-a_{max}$ is the maximum deceleration of the vehicle, $d_{stop}$ is the distance between the vehicle and the closest obstacle in its field of view, $d_{curve}$ is the minimum radius of curvature of the predicted path, and $t_{delay}$ is the time it takes from when an obstacle is sensed until when the vehicle starts decelerating.

The following is a derivation of an example formula used for calculating the speed of the vehicle such that the vehicle is capable of: 1) stopping in time to avoid obstacles, and 2) staying on a curved path. As stated above, $t_{delay}$ is the time it takes from when an obstacle is sensed until when the vehicle starts decelerating. Let $t_{stop}$ be the time required to decelerate a vehicle with maximum negative acceleration value of $-a_{max}$ so that the vehicle will reach a complete stop. If acceleration is zero for $-t_{delay} \leq t \leq 0$, and acceleration is $-a_{max}$ for $0 \leq t \leq t_{stop}$ then velocity is given by:

$$v(t) = v(0) \text{ for } -t_{delay} \leq t \leq 0$$

$$v(t) = v(0) - a_{max} * t \text{ for } 0 \leq t \leq t_{stop}$$

$$v(t_{stop}) = v(0) - a_{max} * t_{stop} = 0$$

Solving for $t_{stop}$ in the equations above yields:

$$t_{stop} = \frac{v(0)}{a_{max}}$$

The distance traveled by the vehicle is given by the equation:

$$d(t_{stop}) = v(0) * t_{delay} + \frac{1}{2} * a_{max} * t_{stop}^2$$

Substituting in the value of $t_{stop}$ in terms of velocity gives the equation:

$$d(t_{stop}) = v(0) * t_{delay} + 1/2 * a_{max} * \left(\frac{v(0)}{a_{max}}\right)^2$$

$$= v(0) * t_{delay} + \frac{(v(0))^2}{2 * a_{max}}$$

Thus, the maximum speed allowed that still allows stopping at distance $d_{stop}$, is obtained by solving the above equation for $v(0)$ as shown below:

$$v(0) = -a_{max} * t_{delay} + \sqrt{(a_{max} * t_{delay})^2 2 + * a_{max} * d_{stop}}$$

The equation for v(0) is the first equation for speed in terms of acceleration, delay and distance. The desired functionality for a speed controller according to embodiments of the present invention is to command the vehicle to move as fast as possible in areas with no obstacles and command the vehicle to decelerate when an obstacle is in field of view of the vehicle. Therefore, the stopping distance, $d_{stop}$, is the distance between the vehicle and the closest obstacle in its field of view and can be represented as follows when using an obstacle map where the vehicle is centered in the middle of the obstacle map referred to as small_moving_grid.

$$d_{stop} = \min_{(x,y,z)_{obst} \in small\_moving\_grid} \left\| \begin{bmatrix} x \\ y \\ z \end{bmatrix}_{vehicle} - \begin{bmatrix} x \\ y \\ z \end{bmatrix}_{obst} \right\|$$

Given that the path produced by various path-planning algorithms (e.g., the Laplacian algorithm) is a curved path, the vehicle should operate slowly enough so that vehicle acceleration, $a_{max}$, can keep the vehicle on that curved path. Given the maximum curvature of the predicted path, the associated minimum radius of curvature is denoted $d_{curve}$. For example, for a nearly rotationally symmetrical vehicle like a ducted fan or helicopter, the maximum lateral acceleration, used to keep the air vehicle on a curved path, is the same as the vehicle max deceleration, $-a_{max}$. The relationship between lateral acceleration, radius of curvature and speed is given by:

$$a_{max} = v_{curve}^2 / d_{curve}$$

Solving for the maximum speed at which there is enough lateral acceleration to stay on the curved path produces the second equation for speed in terms of acceleration and radius of path curvature:

$$v_{curve} = \sqrt{a_{max} * d_{curve}}$$

Using the minimum of the two speeds suggested by the first and second equations for speed as the commanded speed yields the following equation:

$$v_{cmd} = \min(v(0), v_{curve})$$
$$= \min\left( \sqrt{2*a_{max}*d_{stop} + (a_{max}*t_{delay})^2} - a_{max}*t_{delay}, \sqrt{a_{max}*d_{curve}} \right)$$

Including an absolute speed limit, $v_{speed\_max}$, obtained from other considerations, then gives the final version of the example speed controller equation as:

$$v_{cmd} = \min\left( v_{speed\_max}, \sqrt{2*a_{max}*d_{stop} + (a_{max}*t_{delay})^2} - a_{max}*t_{delay}, \sqrt{a_{max}*d_{curve}} \right)$$

This equation can be simplified by setting $t_{delay}$ equal to zero. The simplified equation then becomes:

$$v_{cmd} = \min\left( v_{speed\_max}, \sqrt{a_{max} * \min(2*d_{stop}, d_{curve})} \right)$$

To provide a little extra stopping distance, the factor of two can be removed from the above equation, giving the example speed command equation used by speed planner 104:

$$v_{cmd} = \min\left( v_{speed\_max}, \sqrt{a_{max} * \min(d_{stop}, d_{curve})} \right)$$

Hence, embodiments of the present invention which use this equation consider the distance to closest obstacle, maximum vehicle acceleration capability, and maximum vehicle speed, as well as maximum curvature of the predicted path, to determine the desired speed. For each time step, the path planner computes a new path (e.g. the Laplacian path planner updates the potential on its 3D grid, then a path is computed that follows the negative gradient of that potential). The curvature at each point along a path is the inverse of the radius of circle that smoothly fits the curved path at that point. The radius of the smallest such circle, determines how slowly the vehicle needs to travel to avoid turn-induced acceleration constraints as shown in FIG. 2.

Combining the following three constraints:

speed_cmd ≤ v_max to avoid exceeding vehicle speed limit speed_cmd ≤ $\sqrt{\dfrac{accel\_max*}{min\_dist\_to\_obst}}$ to allow stopping before collision speed_cmd ≤ $\sqrt{\dfrac{accel\_max*}{min\_radius}}$ to allow vehicle to go around curve gives the example speed controller function:

$$speed\_cmd = \min\left[ v\_max, \sqrt{accel\_max * \min\left( \dfrac{min\_dist\_to\_obst,}{min\_radius} \right)} \right]$$

In some embodiments, speed planner 104 is implemented as an application specific integrated circuit (ASIC) or a field programmable gate array (FPGA) configured to execute a speed controller function such as the one described above. In other embodiments, speed planner 104 is implemented as a processing unit which includes or functions with software programs, firmware or computer readable instructions for carrying out various methods, process tasks, calculations, and control functions, used in calculating the desired speeds for an autonomous vehicle.

These instructions are typically tangibly embodied on any appropriate medium used for storage of computer readable instructions or data structures. Such computer readable media can be any available media that can be accessed by a general purpose or special purpose computer or processor, or any programmable logic device. Suitable computer readable media may include storage or memory media such as magnetic or optical media, e.g., disk or CD-ROM, volatile or non-volatile media such as RAM (e.g. SDRAM, DDR SDRAM, RDRAM, SRAM, etc.), ROM, EEPROM, flash memory, etc. as well as transmission media such as electrical, electromagnetic, or digital signals, conveyed via a communication medium such as a network and/or a wireless link.

Speed planner 104 provides the calculated desired speed to vehicle guidance and control system 101. Similarly, path planner 108 provides the calculated path to vehicle guidance and control system 101. Vehicle guidance and control system 101 then transmits commands to one or more actuators 106 in order to initiate changes in the autonomous vehicle's speed according to the calculated desired speed. For example, actuator(s) 106 may include, but are not limited to, wing flaps, and engine throttle in an aerial vehicle. In a ground vehicle, actuator(s) 106 can include, but are not limited to, disc brakes, steering column, gas pedal, etc. Sensor(s) 102 also include sensors which indicate the actual speed of the autonomous vehicle. The actual speed is provided to speed planner 104 as feedback while commands are provided to actuator(s) 106.

Although, the above exemplary equation includes constraints for stopping in time to avoid obstacles, and staying on a curved path, it is to be understood that other constraints are included in other embodiments. For example, exemplary constraints include, but are not limited to, undulation factor of the road (i.e. how bumpy the road is), area vehicle operates in (e.g. travel vs. safety areas), minimum turn radius of the vehicle, need to maintain specified inter-vehicle spacing. Further, it is to be understood that all constraints need not be active simultaneously and that other constraints are included in other embodiments.

As stated above, in some embodiments, the speed computation is performed at each of a plurality of points along the planned path. Accordingly, if the total number of points on the path is N, the speed recommendation for the $k^{th}$ point (k=1 ... N) is:

$v_{plan-k}=\text{sgn}(\text{dir})\min(v_1, v_2, v_3 \ldots v_x)$, where sgn(dir) is ±1 depending on which direction the vehicle is traveling (forward is '+' and reverse is '−'). Also, each of the values $v_1 \ldots v_x$ represents a speed which complies with one of a plurality of constraints, where x is the total number of constraints.

In order to set the speed recommendation, speed planner 104 scans regions near the vehicle based on data obtained from sensor(s) 102. The size of the region being analyzed depends on how fast the vehicle is moving. In particular, in some embodiments implemented in ground vehicles, the width of the region is approximately the same as a lane width, while the length of the region depends on how fast the ground vehicle is moving. Exemplary situations in which speed planner 104 scans regions near the vehicle are shown in FIGS. 3A-3E. It is to be understood that the depictions in FIGS. 3A-3E are provided by way of example and not by way of limitation and that speed planner 104 is used in other situations in other embodiments.

Figure 3A:
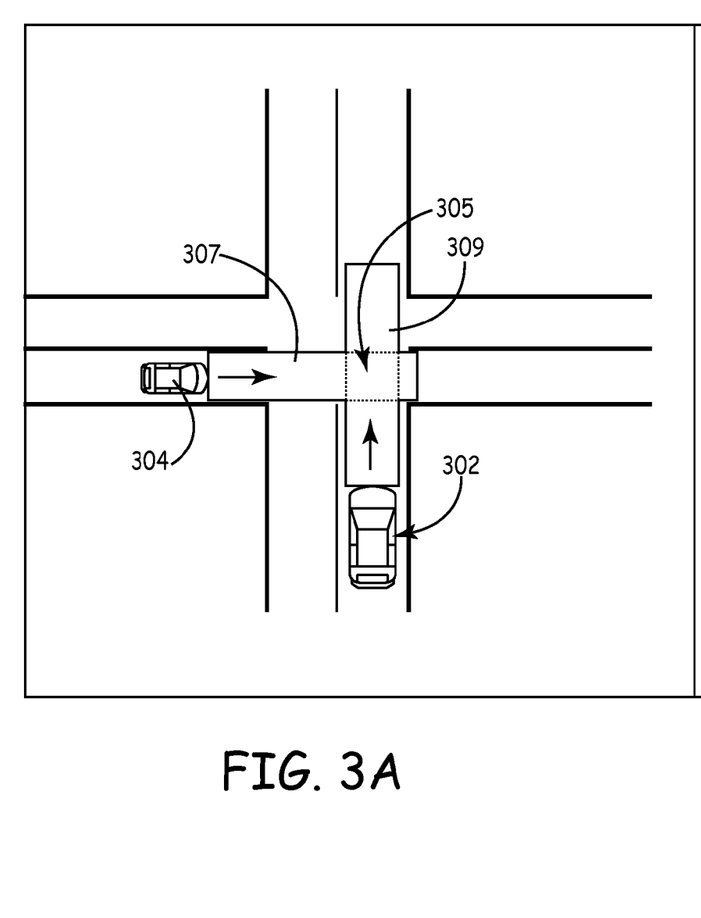
FIGS. 3A-3E depict exemplary situations in which the speed of an autonomous vehicle is regulated according to embodiments of the present invention.
Figure 3B:
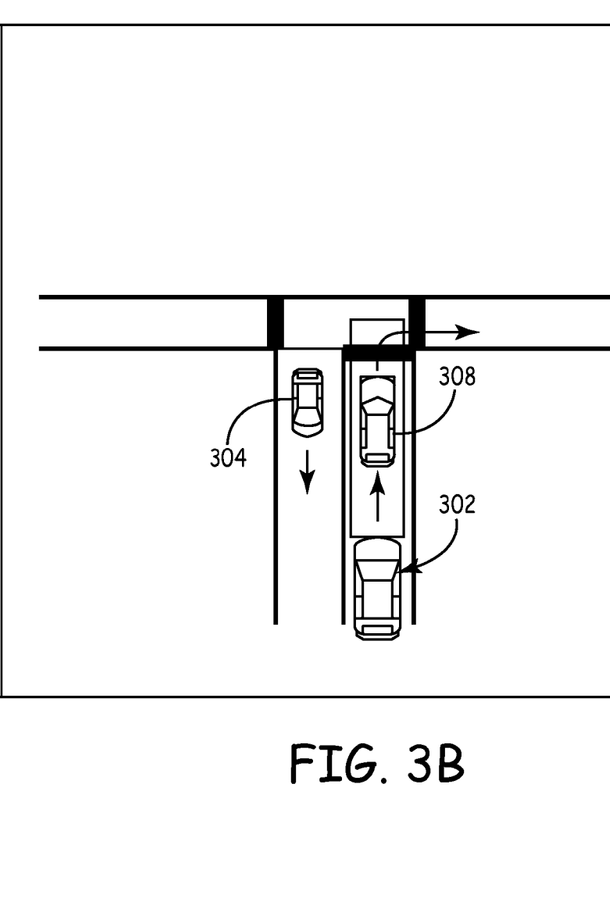

In particular, in FIG. 3A, a region 307 in front of obstacle 304 and a region 309 in front of autonomous vehicle 302 are scanned to identify a potential collision region 305. If a collision region 305 is identified, speed planner 104 calculates an appropriate speed for autonomous vehicle 302 to avoid a collision with obstacle 304. Similarly, in FIG. 3B, speed planner 104 scans a region in front of autonomous vehicle 302 to identify obstacle 308. Based on the movement of obstacle 308 relative to the movement of autonomous vehicle 302, speed planner 104 calculates an appropriate speed to avoid collision with obstacle 308.

Figure 3C:
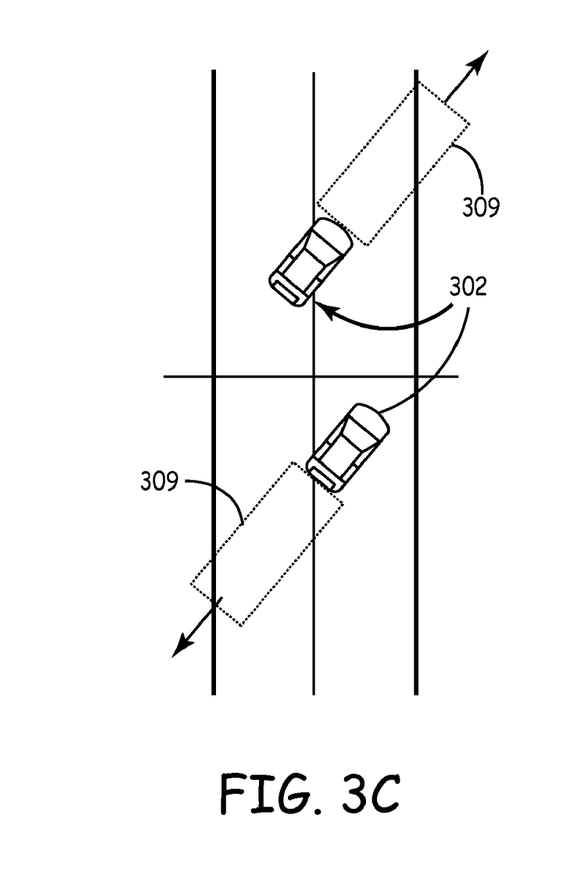
Figure 3D:
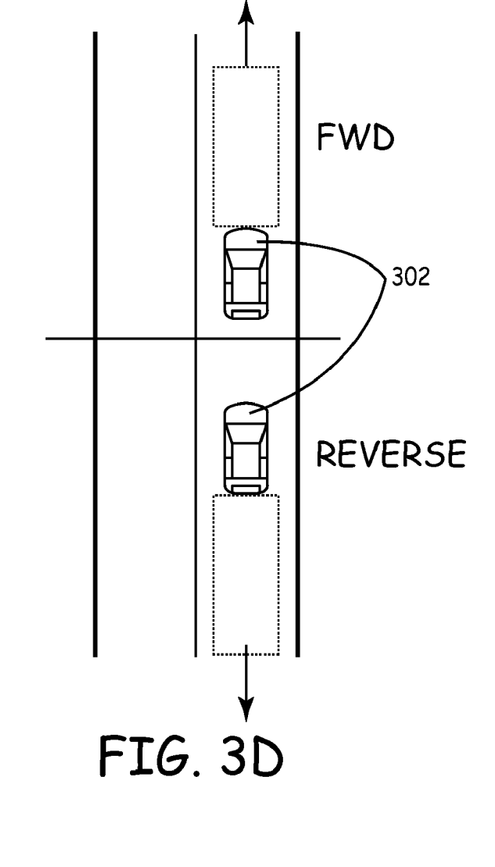

FIG. 3C depicts autonomous vehicle 302 making an n-point turn. As shown, speed planner 104 scans a region 309 which extends from vehicle 302 in the direction of travel. Thus, as the direction of travel changes during an n-point turn, the region 309 also changes to avoid collision with obstacles during the n-point turn. Similarly, FIG. 3D depicts regions 309 which are analyzed during forward and reverse directions of travel. As shown, the regions 309 being scanned extend from the vehicle 302 in the direction of travel.

Figure 3E:
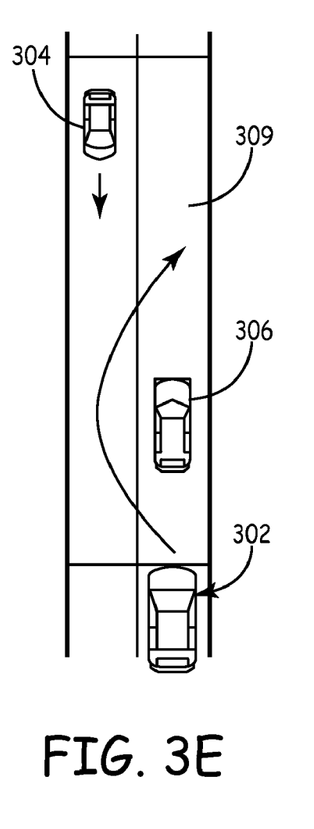

FIG. 3E depicts autonomous vehicle 302 scanning a region 309 prior to passing an obstacle 306. As shown, speed planner 104 scans a region 309 which spans both lanes of travel. The length of region 309 is dependent on the speed of autonomous vehicle 302 and the time necessary to pass obstacle 306. Speed planner 104 analyzes the speed of both obstacle 304 and obstacle 306 to determine an appropriate speed which enables autonomous vehicle to pass obstacle 306 without colliding with either obstacle 304 or obstacle 306. Alternatively, if a speed cannot be determined which will allow vehicle 302 to safely pass obstacle 306 while complying with other constraints, such a determination is also identified to prevent autonomous vehicle from performing the pass maneuver. For example, if the calculated speed to avoid collision is sufficiently high that vehicle 302 would be in danger of rolling or deviating from the road given road conditions, then speed planner 104 determines a speed is not available which complies with all the necessary constraints.

In some embodiments, when speed planner 104 calculates a desired speed for a given situation, speed planner 104 outputs a speed command category along with the desired speed. The speed command category indicates why the desired speed was selected. For example, speed command categories can include, but are not limited to: speed selected to enforce path curvature constraint; speed selected to ensure vehicle can stop before closest obstacle; speed selected to enforce only maximum allowed speed constraint; speed selected to enforce lower road speed limit; speed selected to enforce stop point constraint; speed selected to crawl because closest pixel is unseen (e.g. no sensor data for area in direction of travel); speed selected to crawl to a stop point; speed selected because the planned path has ended; speed selected for an n-point turn; speed selected to stop before passing; and speed selected due to smoothing for meeting target acceleration. The speed command category enables more efficient use of actuators 106 to achieve the desired speed. For example, a speed selected to ensure the vehicle avoids an obstacle can indicate the need for greater application of the brakes, whereas another speed category can indicate that the desired speed is more efficiently reached by reducing throttle rather than application of brakes.

Figure 4:
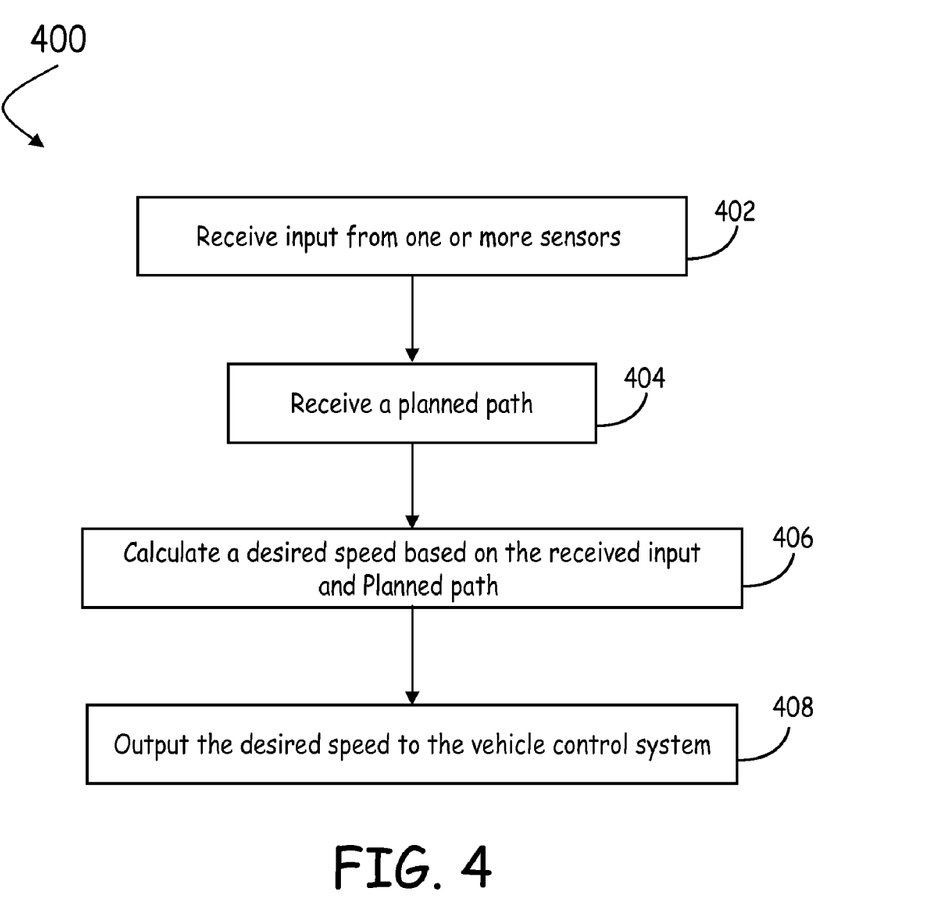
FIG. 4 is a flow chart depicting a method of regulating the speed of an autonomous vehicle according to embodiments of the present invention.

FIG. 4 is a flow chart depicting a method 400 of regulating the speed of an autonomous vehicle according to embodiments of the present invention. Method 400 is implemented in a speed planner of an autonomous vehicle such as speed planner 104 described above. At 402, the speed planner receives data regarding conditions which affect the movement of the autonomous vehicle either directly or indirectly. For example, conditions which indirectly affect the movement of the autonomous vehicle include, but are not limited to, the presence of an obstacle near the autonomous vehicle and assigned speed limits. These conditions indirectly influence the movement of the autonomous vehicle since they do not directly force changes in the movement of the autonomous vehicle, but the speed planner attempts to comply with constraints related to those conditions. Exemplary conditions which directly influence the speed of the vehicle include, but are not limited to, road and weather conditions.

At 404, the speed planner receives a planned path from a path planner such as path planner 108. At 406, the speed planner calculates a desired speed based, at least in part, on the received sensor data and the planned path. In particular, in some embodiments, the speed planner calculates a desired speed for each of a plurality of points along the planned path.

In other embodiments, the speed planner calculates the desired speed for the entire planned path. The speed planner calculates the desired speed based on one or more constraints as described above. In addition, in some embodiments the constraints are prioritized and the speed planner permits a lower priority constraint to be violated if necessary to satisfy a higher priority constraint as described above.

At 408, the speed planner outputs the desired speed to a control system such as control system 101. The control system is configured to calculates speed commands, based on the calculated spped, which are used by one or more actuators to adjust the speed of the autonomous vehicle as described above. In addition to outputting the desired speed, in some embodiments, the speed planner also outputs a speed command category which is used to influence how the actuators adjust the speed of the autonomous vehicle.

Hence, embodiments of the present inventions enable the automatic regulation of the speed of an autonomous vehicle. The regulation of speed, in turn, enables the autonomous vehicle to drive more efficiently and safely in performing its missions.

Although specific embodiments have been illustrated and described herein, it will be appreciated by those of ordinary skill in the art that any arrangement, which is calculated to achieve the same purpose, may be substituted for the specific embodiment shown. For example, although autonomous aerial and ground vehicles are discussed above, it is to be understood that other autonomous vehicles, such as autonomous surface and underwater vehicles, can be implemented in other embodiments. This application is intended to cover any adaptations or variations of the present invention. Therefore, it is manifestly intended that this invention be limited only by the claims and the equivalents thereof.

What is claimed is:

1. An autonomous vehicle comprising:
   one or more sensors configured to obtain data regarding conditions which affect movement of the autonomous vehicle;
   a speed planner coupled to the one or more sensors and configured to calculate a desired speed based, at least in part, on the data obtained from the one or more sensors;
   a control system configured to calculate speed commands based, at least in part, on the speed calculated by the speed planner; and
   one or more actuators configured to adjust the speed of the autonomous vehicle based on the speed commands from the control system;
   wherein the speed planner is further configured to output a speed command category associated with the desired speed.

2. The autonomous vehicle of claim 1, wherein the autonomous vehicle is one of an autonomous aerial vehicle, an autonomous ground vehicle, an autonomous surface vehicle, and an autonomous underwater vehicle.

3. The autonomous vehicle of claim 1, wherein the speed planner is implemented in one of an application specific integrated circuit and a field programmable gate array.

4. The autonomous vehicle of claim 1, wherein the speed planner is further configured to calculate a desired speed for each of a plurality of points along a planned path.

5. The autonomous vehicle of claim 4, further comprising a path planner configured to calculate the planned path and provide the speed planner with the planned path.

6. The autonomous vehicle of claim 1, wherein the one or more sensors are configured to detect obstacles; wherein the speed planner is configured to calculate the desired speed such that the desired speed is the maximum safe speed when no obstacles are detected and the minimum safe speed when obstacles are detected.

7. The autonomous vehicle of claim 1, wherein the speed planner is configured to calculate a desired speed which does not cause the autonomous vehicle to violate one or more constraints.

8. The autonomous vehicle of claim 7, wherein each of the one or more constraints is assigned a priority, wherein the speed planner is configured to allow violation of a lower priority constraint in order to avoid violation of a higher priority constraint.

9. A method of regulating the speed of an autonomous vehicle, the method comprising:
   receiving an input from one or more sensors regarding conditions which affect the movement of the autonomous vehicle;
   calculating a desired speed based, at least in part, on the received input; and
   outputting the desired speed to a control system configured to use the output desired speed to calculate speed commands for use by one or more actuators to adjust the speed of the autonomous vehicle;
   wherein outputting the desired speed includes outputting a speed command category associated with the desired speed.

10. The method of claim 9, wherein calculating the desired speed comprises calculating a desired speed for each of a plurality of points along a planned path.

11. The method of claim 9, wherein calculating the desired speed comprises calculating the desired speed for the entire length of a planned path.

12. The method of claim 9, wherein calculating the desired speed includes calculating the desired speed based on one or more prioritized constraints such that the autonomous vehicle does not violate the one or more prioritized constraints.

13. The method of claim 12, wherein calculating the desired speed based on one or more prioritized constraints includes permitting violation of a lower priority constraint in order to avoid violating a higher priority constraint.

14. A program product comprising program instructions embodied on a processor-readable medium for execution by a programmable processor, wherein the program instructions are operable to cause the programmable processor to:
   calculate a desired speed of an autonomous vehicle based on data received regarding conditions which affect movement of the autonomous vehicle and on one or more prioritized constraints; and
   output the calculated speed to a control system configured to use the output speed to calculate speed commands for use by one or more actuators to adjust the speed of the autonomous vehicle.

15. The program product of claim 14, wherein the data received regarding conditions which affect movement of the autonomous vehicle includes data regarding detected obstacles, wherein the program instructions are further operable to cause the programmable processor to calculate the desired speed such that the desired speed is a maximum safe speed when the received data indicates that no obstacles are detected and a minimum safe speed when the received data indicates that obstacles are detected.

16. The program product of claim 14, wherein the program instructions are further operable to cause the programmable processor to calculate a desired speed for each of a plurality of points along a planned path.

17. The program product of claim 14, wherein the program instructions are further operable to cause the programmable processor to calculate the desired speed by allowing violation of a lower priority constraint in order to avoid violation of a higher priority constraint.

* * * * *